(12) United States Patent
Nakano

(10) Patent No.: US 10,759,347 B2
(45) Date of Patent: Sep. 1, 2020

(54) VEHICLE DISPLAY DEVICE

(71) Applicant: Yazaki Corporation, Tokyo (JP)

(72) Inventor: Junya Nakano, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/682,932

(22) Filed: Aug. 22, 2017

(65) Prior Publication Data

US 2018/0072231 A1 Mar. 15, 2018

(30) Foreign Application Priority Data

Sep. 14, 2016 (JP) .................................. 2016-179313

(51) Int. Cl.
*B60R 1/12* (2006.01)
*B60K 35/00* (2006.01)
(Continued)

(52) U.S. Cl.
CPC ................ *B60R 1/12* (2013.01); *B60K 35/00* (2013.01); *G02B 27/0101* (2013.01);
(Continued)

(58) Field of Classification Search
CPC ................ B60R 1/12; B60R 2300/207; B60R 2300/205; B60R 2001/1215; B60K 35/00;
(Continued)

(56) References Cited

U.S. PATENT DOCUMENTS

2002/0018182 A1* 2/2002 Aoki .................... G03B 21/006
353/13
2002/0186228 A1 12/2002 Kobayashi et al.
(Continued)

FOREIGN PATENT DOCUMENTS

JP 3-47591 U 5/1991
JP 2008-116566 A 5/2008
(Continued)

OTHER PUBLICATIONS

French Preliminary Search Report for the related French Patent Application No. 1758403 dated Feb. 6, 2019.
(Continued)

*Primary Examiner* — Joseph G Ustaris
*Assistant Examiner* — Jill D Sechser
(74) *Attorney, Agent, or Firm* — Kenealy Vaidya LLP

(57) ABSTRACT

A vehicle display device includes a tubular member disposed such that an opening edge thereof faces a driver side, a projection unit that projects light toward an inner space of the tubular member, a semitransparent mirror that is disposed in the inner space of the tubular member and reflects light projected from the projection unit toward the driver side to cause a virtual image to be displayed, an image display unit that is disposed on a side opposite to the driver side with respect to the semitransparent mirror in the tubular member and displays an image, and a design unit that is disposed between the image display unit and the semitransparent mirror in the inner space of the tubular member and has a stereoscopic shape.

19 Claims, 13 Drawing Sheets

(51) Int. Cl.
  *G02B 27/01* (2006.01)
  *G02B 30/00* (2020.01)
  *B60K 37/02* (2006.01)
(52) U.S. Cl.
  CPC .......... *B60K 37/02* (2013.01); *B60K 2370/15* (2019.05); *B60K 2370/155* (2019.05); *B60K 2370/161* (2019.05); *B60K 2370/188* (2019.05); *B60K 2370/29* (2019.05); *B60K 2370/334* (2019.05); *B60K 2370/347* (2019.05); *B60R 2001/1215* (2013.01); *B60R 2300/205* (2013.01); *B60R 2300/207* (2013.01); *G02B 30/00* (2020.01)
(58) Field of Classification Search
  CPC .... B60K 2350/2052; B60K 2350/2026; B60K 2350/1072; B60K 2370/334; B60K 2370/29; B60K 2370/155; B60K 2370/15; B60K 2370/161; B60K 2370/347; G02B 27/0101
  See application file for complete search history.

(56) References Cited

U.S. PATENT DOCUMENTS

| | | | | |
|---|---|---|---|---|
| 2003/0058390 A1* | 3/2003 | Fujii | ............. | G02B 5/045 349/113 |
| 2004/0212482 A1* | 10/2004 | Kaneda | ............. | B60K 35/00 340/425.5 |
| 2005/0040940 A1* | 2/2005 | Sonobe | ............. | B60K 37/02 340/438 |
| 2007/0085708 A1* | 4/2007 | Kato | ............. | G01C 21/265 340/995.1 |
| 2009/0116097 A1* | 5/2009 | McCabe | ............. | B60R 1/12 359/267 |
| 2016/0033770 A1* | 2/2016 | Fujimaki | ............. | G06T 19/006 345/8 |
| 2017/0144544 A1* | 5/2017 | Fujita | ............. | B60K 37/02 340/438 |
| 2017/0161009 A1* | 6/2017 | Ogisu | ............. | G06F 3/1446 |
| 2017/0174081 A1* | 6/2017 | Nojiri | ............. | B60K 35/00 |
| 2017/0253178 A1* | 9/2017 | Tane | ............. | G06T 19/006 345/8 |
| 2019/0009796 A1* | 1/2019 | Fujii | ............. | B60W 50/14 |
| 2020/0064640 A1* | 2/2020 | Nagano | ............. | G02B 27/0101 |

FOREIGN PATENT DOCUMENTS

| | | |
|---|---|---|
| JP | 2009-47666 A | 3/2009 |
| JP | 2012-106702 A | 6/2012 |
| JP | 2014-228391 A | 12/2014 |
| WO | 2016/021102 A1 | 2/2016 |

OTHER PUBLICATIONS

Japanese Office Action for the related Japanese Patent Application No. 2016-179313 dated Oct. 2, 2018.

* cited by examiner

VEHICLE DISPLAY DEVICE

CROSS-REFERENCE TO RELATED APPLICATION(S)

The present application claims priority to and incorporates by reference the entire contents of Japanese Patent Application No. 2016-179313 filed in Japan on Sep. 14, 2016.

BACKGROUND OF THE INVENTION

1. Field of the Invention

The present invention relates to a vehicle display device.

2. Description of the Related Art

There have been vehicle display devices displaying virtual images. Japanese Patent Application Laid-open No. 2012-106702 discloses a vehicle display device disposed in a meter hood that is provided on an upper surface of an instrument panel of a vehicle and has a space between itself and the upper surface to communicate a cabin side with a front window shield side of the vehicle. The vehicle display device disclosed in Japanese Patent Application Laid-open No. 2012-106702 includes a light emitting display source provided on a ceiling portion of the meter hood so as to face the upper surface of the instrument panel and a reflective plate that has translucency and is provided in the space such that the reflective plate reflects display light emitted from the light emitting display source toward an eye point in the vehicle cabin.

SUMMARY OF THE INVENTION

The conventional vehicle display device still has a room for improvement to produce a stereoscopic effect. The invention aims to provide a vehicle display device that can enhance a stereoscopic effect.

A vehicle display device according to one aspect of the present invention includes a tubular member that is disposed such that an opening edge thereof faces a driver side; a projection unit that projects light toward an inner space of the tubular member; a semitransparent mirror that is disposed in the inner space of the tubular member, and reflects light projected from the projection unit toward the driver side to cause a virtual image to be displayed; an image display unit that is disposed on a side opposite to the driver side with respect to the semitransparent mirror in the tubular member, and displays an image; and a design unit that is disposed between the image display unit and the semitransparent mirror in the inner space of the tubular member, and has a stereoscopic shape, wherein the virtual image is displayed such that at least a part of the virtual image overlaps with the design unit.

According to another aspect of the present invention, in the vehicle display device, it is preferable that the projection unit projects an image and causes the image to be displayed as a virtual image.

According to still another aspect of the present invention, in the vehicle display device, it is preferable that the image display unit is positioned on a side opposite to the driver side with respect to a position at which the virtual image is formed.

According to still another aspect of the present invention, in the vehicle display device, it is preferable that the design unit is a transparent member, and an image in the image display unit is capable of being viewed from the driver side through the design unit.

According to still another aspect of the present invention, in the vehicle display device, it is preferable that the projection unit projects an image and causes the image to be displayed as a virtual image, and when a position of a display image is changed and the display image overlaps with the design unit, the vehicle display device causes the projection unit to display a part of the display image overlapping with the design unit as a virtual image, and causes the image display unit to display a remaining part of the display image as an actual image.

According to still another aspect of the present invention, in the vehicle display device, it is preferable that the vehicle display device further includes a supporter that is interposed between the tubular member and the design unit, supports the design unit, and is transparent.

According to still another aspect of the present invention, in the vehicle display device, it is preferable that the supporter is a plate-like member that partitions the inner space of the tubular member and supports the design unit at a position apart from an inner wall surface of the tubular member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes embodiments of a vehicle display device according to the invention in detail with reference to the accompanying drawings. The embodiments do not limit the invention. The elements of the following embodiments include elements that the persons skilled in the art can easily assume or that are substantially the same as the elements known by those in the art.

First Embodiment

Figure 1:
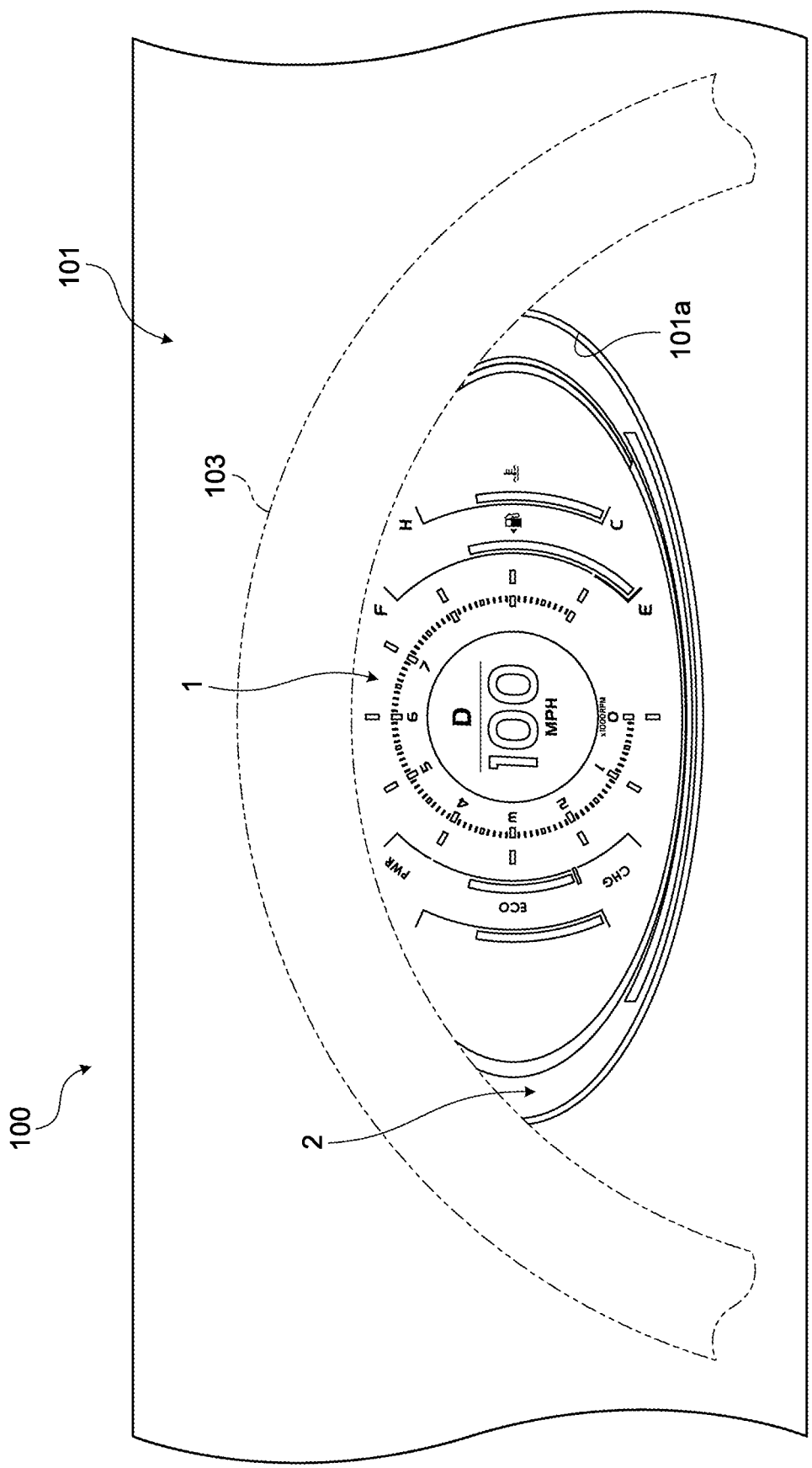
FIG. 1 is a front view illustrating a state where a vehicle display device according to a first embodiment is mounted on a vehicle.
Figure 2:
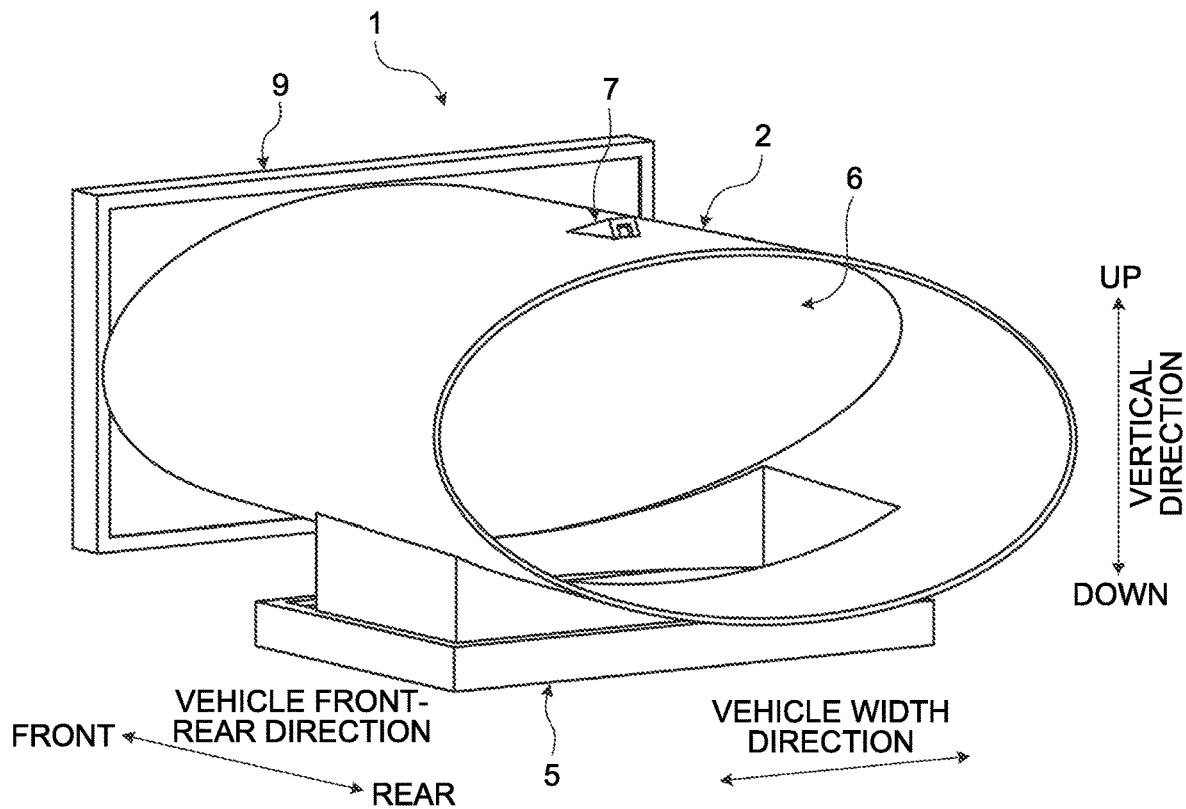
FIG. 2 is a perspective view of the vehicle display device according to the first embodiment.
Figure 3:
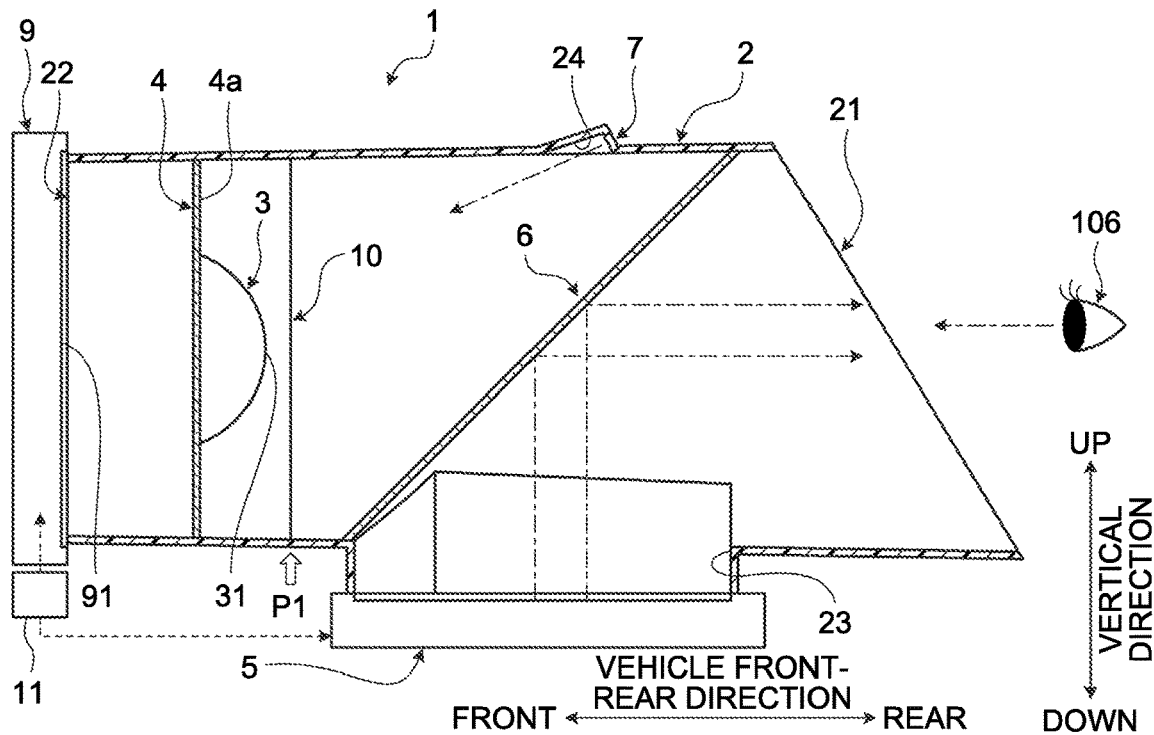
FIG. 3 is a cross-sectional view of the vehicle display device according to the first embodiment.
Figure 4:
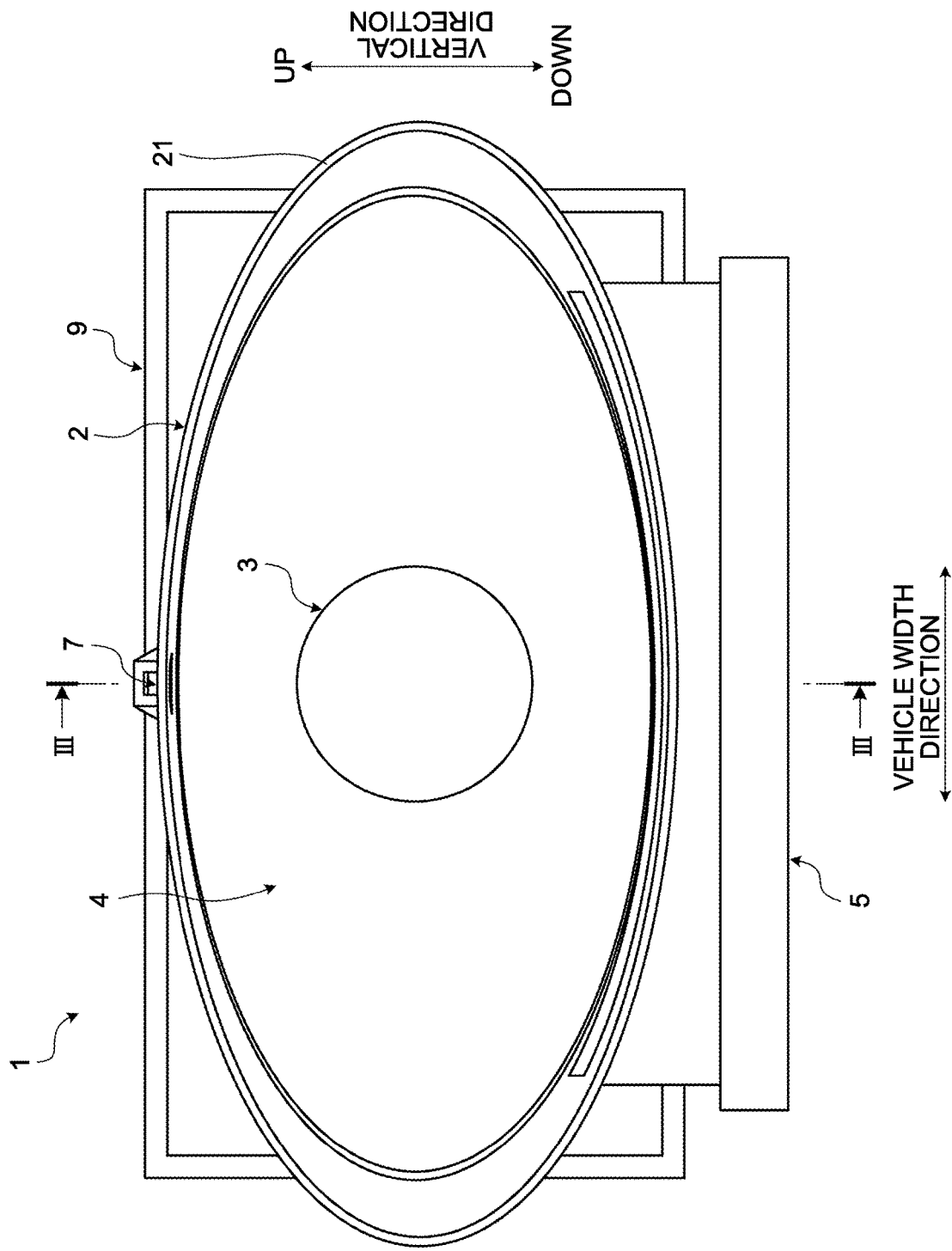
FIG. 4 is a front view of the vehicle display device according to the first embodiment.
Figure 5:
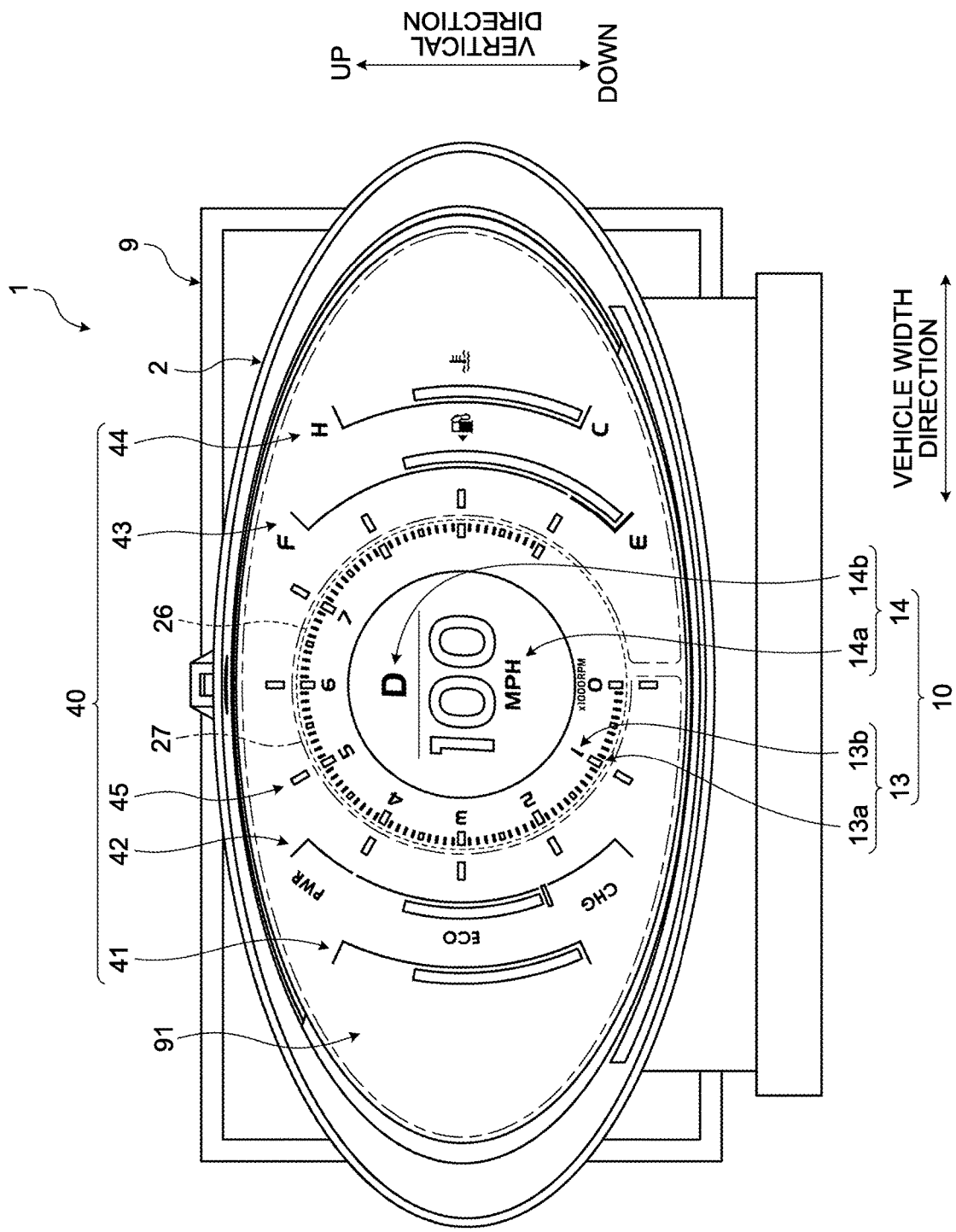
FIG. 5 is a front view illustrating an image display state of the vehicle display device according to the first embodiment.
Figure 6:
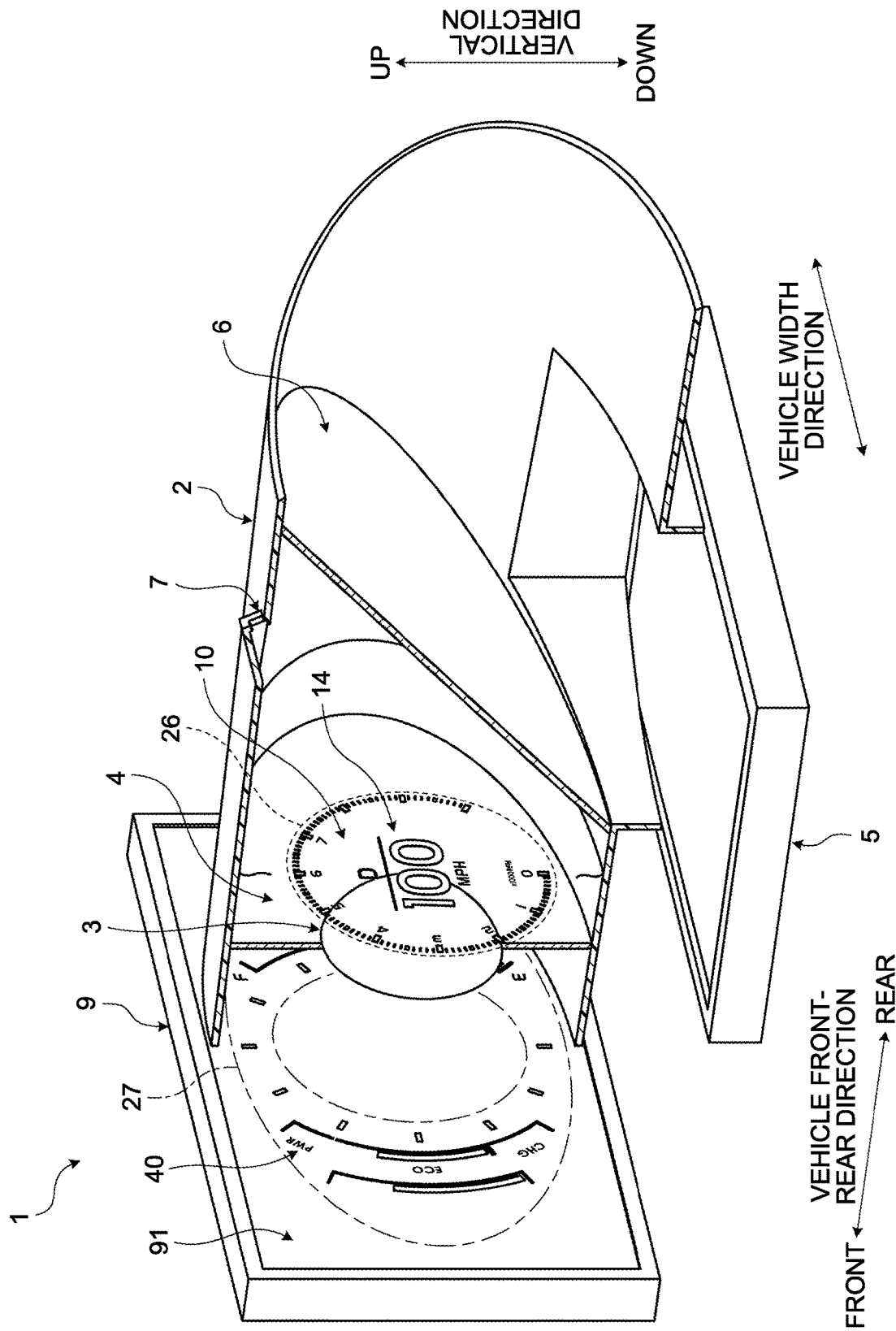
FIG. 6 is a perspective view illustrating the image display state of the vehicle display device according to the first embodiment.

A first embodiment is explained with reference to FIGS. 1 to 6. The first embodiment relates to a vehicle display device. FIG. 1 is a front view of a state where a vehicle display device according to the first embodiment is mounted on a vehicle. FIG. 2 is a perspective view of the vehicle display device according to the first embodiment. FIG. 3 is a cross-sectional view of the vehicle display device according to the first embodiment. FIG. 4 is a front view of the vehicle display device according to the first embodiment. FIG. 5 is a front view illustrating an image display state of the vehicle display device according to the first embodiment. FIG. 6 is a perspective view illustrating the image display state of the vehicle display device according to the first embodiment. FIG. 3 illustrates a cross section along the line III-III in FIG. 4.

As illustrated in FIG. 1, a vehicle display device 1 according to the embodiment is disposed on an instrument panel 101 of a vehicle 100. The instrument panel 101 has an opening 101a. The opening 101a is provided at a position that allows a driver to view the vehicle display device 1 over a steering wheel 103, for example. The vehicle display device 1 is housed in an inner space surrounded by the instrument panel 101. A tubular member 2 of the vehicle display device 1 is fitted to the opening 101a. An edge of the tubular member 2 is exposed on a side facing a person on board from the opening 101a. The person on board can view display content on the vehicle display device 1 through the opening 101a. The person on board is typically the driver who sits on the driver seat of the vehicle 100.

In the present description, a "vertical direction" is the vertical direction of the vehicle 100 on which the vehicle display device 1 is mounted. A "vehicle width direction" is the width direction of the vehicle 100 on which the vehicle display device 1 is mounted. A "vehicle front-rear direction" is the front-rear direction of the vehicle 100. The vehicle display device 1 in the present embodiment is mounted on the vehicle 100 such that the axial direction of the tubular member 2, which is described later, coincides with the vehicle front-rear direction.

As illustrated in FIGS. 2 to 4, the vehicle display device 1 in the present embodiment includes the tubular member 2, a design unit 3, a supporter 4, a projection unit 5, a semitransparent mirror 6, a light source 7, an image display unit 9, and a controller 11. The tubular member 2, which is a hollow tubular member, is open at both sides thereof. The tubular member 2 in the present embodiment has a cross section having an elliptical shape. The tubular member 2 is integrally formed of a synthetic resin, for example. The tubular member 2 preferably has a light blocking property.

The tubular member 2 is mounted on the vehicle 100 such that a short axis direction of the tubular member 2 coincides with the vertical direction. An opening edge 21, which is one opening edge, of the tubular member 2 faces backward. An opening edge 22, which is the other opening edge, of the tubular member 2 faces forward.

The tubular member 2 is disposed in such a manner that one opening edge 21 faces a side facing a driver 106 on the driver's seat and the other opening edge 22 faces the vehicle front direction. In the following description, the opening edge 21 facing the driver 106 side (driver's seat side) of the tubular member 2 is described as the "rear side opening edge 21", while the opening edge 22 facing the vehicle front direction is described as the "front side opening edge 22". As illustrated in FIG. 3, the rear side opening edge 21 is tilted with respect to the vertical direction. The rear side opening edge 21 is tilted in such a manner that as it moves backward, it moves downwardly.

The tubular member 2 in the present embodiment is formed in a tapered shape having a cross-section area decreasing from the rear toward the front. More specifically, the lengths of the short and long axes of the tubular member 2 decrease from the rear toward the front. This shape causes the driver 106 to feel a sense of depth of the tubular member 2 longer than the actual depth when the driver 106 views the tubular member 2.

The projection unit 5 projects light toward the inner space of the tubular member 2. The projection unit 5 in the present embodiment is a liquid crystal display device such as a thin film transistor-liquid crystal display (TFT-LCD). The projection unit 5 is disposed to a lower portion of the tubular member 2. The lower portion of the tubular member 2 is provided with an opening 23. The projection unit 5 has an image display surface disposed to the opening 23 such that the image display surface faces upward. The projection unit 5, thus, projects an image toward the inner space of the tubular member 2 via the opening 23. The projection unit 5 projects light in a direction intersecting the axis direction, typically, a direction perpendicular to the axis direction, of the tubular member 2.

The semitransparent mirror 6, which is a semitransparent member, is disposed in the inner space of the tubular member 2. The semitransparent mirror 6 reflects part of incident light and transmits other part of the incident light. The semitransparent mirror 6 includes a main body formed of a transparent resin or a glass, for example, and a semi-transparent mirror layer. The semitransparent mirror layer is a metallic or inorganic multi-layered thin film formed on a surface of the main body by vapor deposition, for example. The semitransparent mirror 6, which is a plate-like member having an elliptical shape, partitions the inner space of the tubular member 2 into a space on the front side and a space on the rear side. The semitransparent mirror 6 is disposed by being tilted such that the semitransparent mirror 6 faces the projection unit 5. The semitransparent mirror 6 is tilted in such a manner that as it moves downwardly, it moves forward. The semitransparent mirror 6 reflects light projected from the projection unit 5 upward toward the driver 106 side, thereby causing an image produced by the projection unit 5 to be displayed as a virtual image 10. The image reflected by the semitransparent mirror 6 is formed as the virtual image 10 more forward than the semitransparent mirror 6. The vehicle display device 1 in the present embodiment is configured to form the virtual image 10 in the inner space of the tubular member 2, i.e., configured to position a focal position of the virtual image 10 in the inner space of the tubular member 2.

The design unit 3 is a stereoscopic design member having a stereoscopic shape. The design unit 3 is disposed on a side opposite to the driver 106 side with respect to the semitransparent mirror 6 in the inner space of the tubular member 2. The design unit 3 in the first embodiment is spherically shaped. The design unit 3 is a plate-like member curved toward the driver 106 side in a spherical shape. In other words, the design unit 3 has a shape obtained as a result of cutting a part of a hollow sphere by a plane. The design unit 3 in the present embodiment is formed of a transparent or semitransparent material such as a synthetic resin or a glass. The design unit 3 is disposed coaxially with the central axis line of tubular member 2.

The supporter 4, which is interposed between the tubular member 2 and the design unit 3, supports the design unit 3. The supporter 4 allows light to travel between the rear side opening edge 21 and the front side opening edge 22 of the tubular member 2. The supporter 4 in the present embodiment is a transparent plate-like member, and is formed of a synthetic resin, for example. The supporter 4 is a material that can transmit light. The supporter 4 allows light to travel from the rear side opening edge 21 to the front side opening edge 22, and from the front side opening edge 22 to the rear side opening edge 21 in the inner space of the tubular member 2. The supporter 4 has an elliptical shape corresponding to the cross-sectional shape of the tubular member 2. The outer edge of the supporter 4 is fixed to an inner wall surface of the tubular member 2. The supporter 4 is disposed in perpendicular to the central axis line of the tubular member 2, thereby partitioning the inner space of the tubular member 2 into a space on the front side and a space on the rear side. The design unit 3 is fixed on a surface 4a on the driver 106 side of the supporter 4. The design unit 3 is fixed on the supporter 4 by adhesive bonding or welding, for example.

The surface of the supporter 4 is processed to suppress reflection of light. Both sides of the supporter 4 in the present embodiment are treated with anti-reflection (AR) coating. The processing can prevent reflection of light at the surfaces of the supporter 4. As a result, the driver 106 hardly sees the presence of the supporter 4.

The light source 7, which is a light emitting unit such as a light emitting diode (LED), radiates light toward the inner space of the tubular member 2. The light source 7 is disposed between the semitransparent mirror 6 and the design unit 3. The upper side inner wall surface of the tubular member 2 is provided with a recess 24. The light source 7 is disposed in the recess 24. The light source 7 radiates light obliquely downwardly so as to light up the space more forward than the semitransparent mirror 6. The light source 7 radiates light toward the design unit 3 so as to light up the design unit 3, for example. Part of light radiated from the light source 7 is reflected by the design unit 3 toward the driver 106. This reflected light allows the driver 106 to easily recognize the presence and the shape of the design unit 3.

The image display unit 9 is disposed to the front side opening edge 22 of the tubular member 2. The image display unit 9 has a display surface 91 on which an image is displayed. The display surface 91 closes the front side opening edge 22. The image display unit 9 is disposed on a side opposite to the driver 106 side with respect to the semitransparent mirror 6 in the tubular member 2. The design unit 3 is disposed between the image display unit 9 and the semitransparent mirror 6 in the inner space of the tubular member 2.

The image display unit 9 in the present embodiment is a liquid crystal display device such as a TFT-LCD. The image display unit 9 displays an image on the display surface 91. The display surface 91 faces the driver 106 side with the design unit 3, the supporter 4, and the semitransparent mirror 6 interposed therebetween. A plane area of the display surface 91 is larger than that of the design unit 3. The design unit 3 is disposed such that the design unit 3 overlaps with the central portion of the display surface 91 when viewed from the driver 106 side.

The projection unit 5 and the semitransparent mirror 6 cause the virtual image 10 to be displayed in a virtual image display region 26 illustrated in FIG. 5. The virtual image display region 26 includes the region overlapping with the design unit 3 when viewed from the driver 106 side. The virtual image display region 26 in the present embodiment has a circular shape having the design unit 3 as the central part when viewed from the driver 106 side while facing the design unit 3. The virtual image display region 26 has a circular shape having the central axis line of the design unit 3 as the center. In the virtual image display region 26, indicator images 13 and a central display image 14 are displayed, for example. The indicator images 13 include scale images 13a and numerical images 13b. The indicator images 13 in the present embodiment are indicators of a rotating speed of the engine mounted on the vehicle. The indicator images 13 are arranged with certain intervals in a circumferential direction such that the indicator images 13 surround the design unit 3. The numerical images 13b are the images of the numerical values corresponding to the scale images 13a. In the virtual image display region 26, an indicating needle image, which is not illustrated in FIG. 5, is further displayed. The indicating needle image is the virtual image 10 that indicates the scale image 13a corresponding to the current rotating speed of the engine.

The central display image 14 is displayed while overlapping with the design unit 3. The central display image 14 overlaps with the design unit 3 when viewed from the driver 106 side. The central display image 14 includes a speed image 14a displaying a traveling speed of the vehicle as a numerical value and a shift position image 14b displaying a transmission shift position of the vehicle.

The image display unit 9 displays an image in an adjacent region 27 illustrated in FIG. 5. The adjacent region 27 is adjacent to the design unit 3 when viewed from the driver 106 side. The adjacent region 27 in the present embodiment surrounds the virtual image display region 26 when viewed from the driver 106 side. The boundary inside the adjacent region 27 is the outer periphery of the virtual image display region 26. The boundary outside the adjacent region 27 is the inner periphery of the tubular member 2. The image display unit 9 displays an image 40 in the adjacent region 27 of the display surface 91.

The image 40 in the image display unit 9 includes a battery information image 41, a power information image 42, a fuel information image 43, a water temperature information image 44, and scale images 45. The battery information image 41 displays a remaining charge amount of a battery mounted on the vehicle. The power information image 42 displays information about output power of the vehicle. The battery information image 41 and the power information image 42 are displayed on the left side of the virtual image display region 26 when viewed from the driver 106 side.

The fuel information image 43 displays a remaining fuel amount of the vehicle. The water temperature information image 44 displays an engine water temperature. The fuel information image 43 and the water temperature information image 44 are displayed on the right side of the virtual image display region 26 when viewed from the driver 106 side. The scale images 45 correspond to the scale images 13a in the virtual image display region 26. The scale images 45 are arranged with certain intervals in a circumferential direction such that the scale images 45 surround the scale images 13a.

The projection unit 5, the image display unit 9, and the light source 7 are controlled by the controller 11. The controller 11 is a control circuit or a control device that includes a storage unit, an arithmetic unit, and an input-output unit, for example. The controller 11 commands the projection unit 5 on a content of an image to be projected. The projection unit 5 produces the image in a liquid crystal unit in accordance with the command from the controller 11 and projects the produced image toward the semitransparent mirror 6. The controller 11 commands the image display unit 9 on a content of an image to be displayed. The image display unit 9 produces the image on the display surface 91 in accordance with the command from the controller 11.

As illustrated in FIG. 6, the virtual image 10 is displayed on a nearer side than the display surface 91 of the image display unit 9 when viewed from the driver 106 side. In other words, the image display unit 9 is disposed on a side opposite to the driver 106 side with respect to the position at which the virtual image 10 is formed. As illustrated in FIG. 3, in the vehicle display device 1 in the present embodiment, a position P1 at which the virtual image 10 is formed (hereinafter, simply described as the "image formed position P1") is located more backward than a rear end 31 of the design unit 3, i.e., on the driver 106 side.

The driver 106 sees the central display image 14 as if the central display image 14 is displayed on the surface of the design unit 3. The vehicle display device 1 in the present embodiment, thus, can perform stereoscopic display through the combination of the stereoscopically shaped design unit 3 and the virtual image 10. The combination of the virtual image 10 formed at the image formed position P1 and the design unit 3 having a deep stereoscopic shape forms a whole design. As a result, the driver 106 is easily aware of a breadth of the inner space of the tubular member 2 in the depth direction.

By displaying the virtual image 10 in an overlapping manner with the spherical surface of the design unit 3, the virtual image 10 appears as if the virtual image 10 is on the display surface having a spherical shape. The virtual image 10 appears as if the virtual image 10 is curved along the spherical surface of the design unit 3, thereby achieving a display having a stereoscopic effect.

The image 40 is displayed in the image display unit 9 such that the image 40 surrounds the virtual image 10 when viewed from the driver 106 side. A difference between the position of the image 40 and the image formed position P1 of the virtual image 10 in the vehicle front-rear direction causes the driver 106 to be aware of the breadth of the inner space of the tubular member 2 in the depth direction.

The tubular member 2 in the present embodiment has the rear side opening edge 21 tilted obliquely upward. Light inside the vehicle cabin, thus, easily enters the inner space of the tubular member 2. Light entering the tubular member 2 lights the inner wall surface of the tubular member 2, thereby causing the driver 106 to be aware of the depth and the stereoscopic effect of the inner space of the tubular member 2. Light entering the tubular member 2 is reflected by the design unit 3 toward the driver 106, thereby causing the driver 106 to be more strongly aware of the stereoscopic effect of the design unit 3.

The supporter 4, which is a transparent plate-like member, connects the design unit 3 and the inner wall surface of the tubular member 2. The supporter 4 allows the person on board to see the design unit 3 and the image 40 by the image display unit 9 through the supporter 4 because the supporter 4 is the transparent plate-like member.

The surface of the supporter 4 is processed to suppress reflection of light. The processing causes the supporter 4 to be more unnoticeable than the design unit 3, thereby making it hard for the supporter 4 to be recognized. The vehicle display device 1 in the present embodiment makes it possible for the design unit 3 to be seen as if the design unit 3 is floating in the air. In the present embodiment, the processing that suppresses the reflection of light is performed on both sides of the supporter 4. The processing may be performed on any one of the sides of the supporter 4.

The vehicle display device 1 in the present embodiment produces a display having a large stereoscopic effect by the design unit 3 having a stereoscopic shape, the virtual image 10 displayed such that the virtual image 10 overlaps with the design unit 3 when viewed from the driver 106 side, and the image 40 displayed farther in the depth direction than the virtual image 10 and the design unit 3 when viewed from the driver 106 side.

As described above, the vehicle display device 1 according to the embodiment includes the tubular member 2, the projection unit 5, the semitransparent mirror 6, the image display unit 9, and the design unit 3. The tubular member 2 is disposed such that the rear side opening edge 21 faces the driver 106 side. The projection unit 5 projects light toward the inner space of the tubular member 2. The semitransparent mirror 6 is disposed in the inner space of the tubular member 2, and reflects light projected from the projection unit 5 toward the driver 106 side to cause the virtual image 10 to be displayed. The image display unit 9 is disposed on a side opposite to the driver 106 with respect to the semi-transparent mirror 6 in the tubular member 2, and displays the image 40. The design unit 3 has a stereoscopic shape, and is disposed between the image display unit 9 and the semitransparent mirror 6 in the inner space of the tubular member 2. The vehicle display device 1 in the present embodiment causes at least a part of the virtual image 10 to be displayed while overlapping with the design unit 3.

The vehicle display device 1 in the present embodiment can enhance the stereoscopic effect by the virtual image 10 displayed by the projection unit 5 and the semitransparent mirror 6, the design unit 3 having a stereoscopic shape, and the image 40 in the image display unit 9 disposed farther than the design unit 3 in the depth direction. Various stereoscopic effects can be produced by the combination of the design unit 3 practically existing in the inner space of the tubular member 2, the virtual image displayed while overlapping with the design unit 3, and the actual image displayed by the image display unit 9.

The projection unit 5 in the present embodiment projects an image and causes the image to be displayed as a virtual image. The projection unit 5 can produce and project any image in accordance with a command from the controller 11, and cause the produced image to be displayed as the virtual image 10. The projection unit 5, thus, can enhance the stereoscopic effect of display by overlapping any virtual image 10 with the design unit 3 at any position on the design unit 3.

The image display unit 9 in the present embodiment is disposed on a side opposite to the driver 106 side with respect to the position P1 at which the virtual image 10 is formed. The image 40 in the image display unit 9 is positioned farther than the virtual image 10 in the depth direction when viewed from the driver 106 side. The difference between the position of the virtual image 10 and the position of the image 40 in the depth direction when viewed from the driver 106 side enhances the stereoscopic effect of display.

The design unit 3 in the present embodiment is a transparent member, and thus allows the image 40 in the image display unit 9 to be viewed through the design unit 3 from the driver 106 side. The combination of the virtual image 10, the design unit 3, and the image 40, thus, can enhance the stereoscopic effect. The image display unit 9 can display the image 40 behind the design unit 3 when viewed from the driver 106 side. In other words, the image display unit 9 can display the image 40 in an overlapping manner with the design unit 3. The image 40 viewed through the design unit 3 can cause the driver 106 to feel a sense of stereoscopic effect.

The vehicle display device 1 in the present embodiment further includes the transparent supporter 4 that is interposed between the tubular member 2 and the design unit 3, and supports the design unit 3. The transparent supporter 4 allows the image 40 in the image display unit 9 to pass through therein and to reach the driver 106. The supporter 4, thus, can support the design unit 3 without hindering the visibility of the image 40.

The supporter 4 in the present embodiment is a plate-like member that partitions the inner space of the tubular member 2 and supports the design unit 3 at a position apart from the inner wall surface of the tubular member 2. The design unit 3 supported at the position far from the inner wall surface of the tubular member 2 is seen as if the design unit 3 is floating in the inner space of the tubular member 2. This structure makes it possible to enhance the stereoscopic effect and a design effect in the vehicle display device 1.

Figure 7:
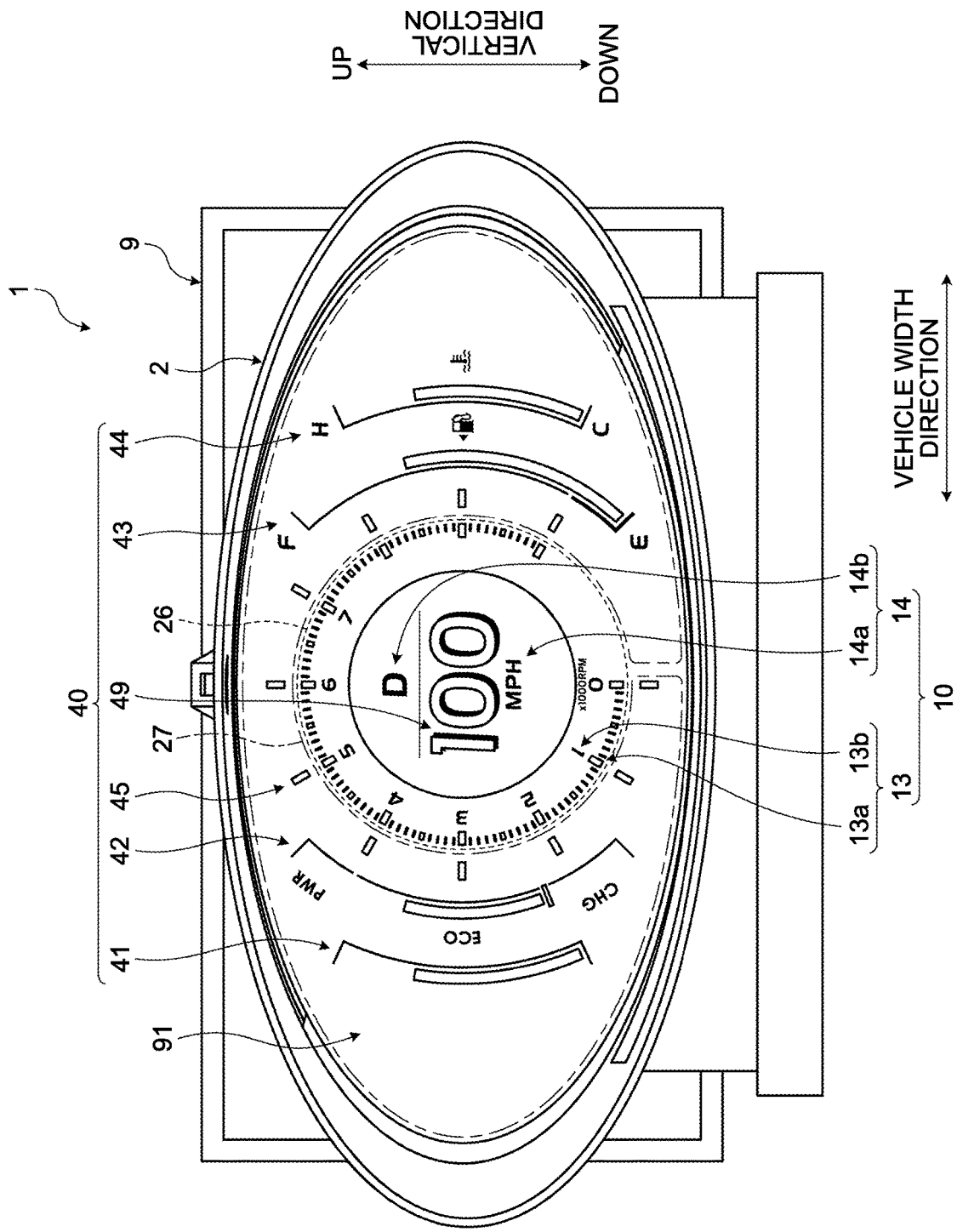
FIG. 7 is a front view illustrating an example of the image display by the vehicle display device in the first embodiment.

The image display unit 9 may display the image 40 behind the design unit 3 when viewed from the driver 106 side. As illustrated in FIG. 7, the image display unit 9 displays an image 49 behind the speed image 14a when viewed from the driver 106 side, for example. The image 49 displayed behind the speed image 14a is the shadow of the speed image 14a. The image display unit 9 displays the character "100", which is the same as that of the speed image 14a, at the position slightly off from and behind the speed image 14a. As a result, the speed image 14a can be displayed together with the shadow thereof.

Figure 8:
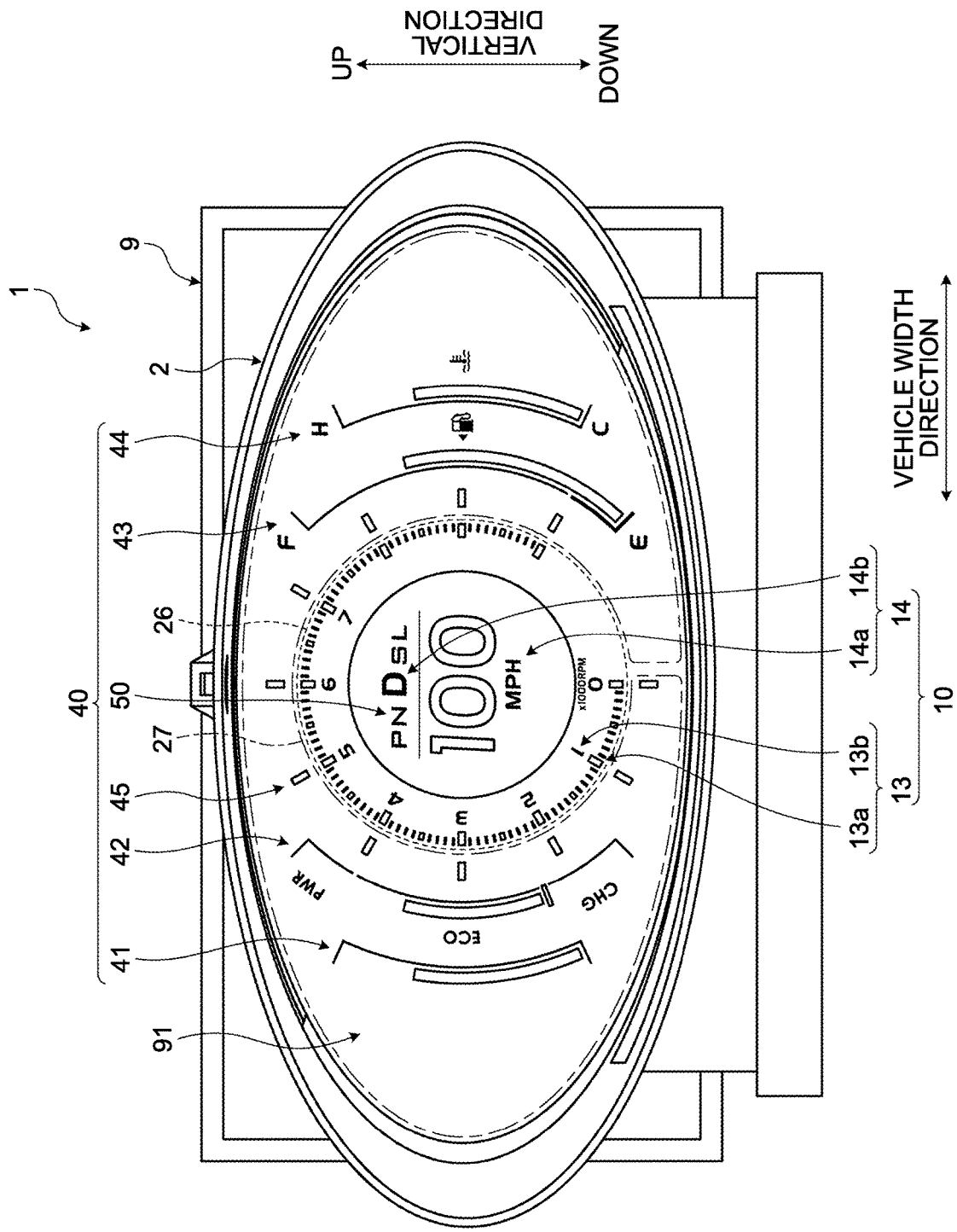
FIG. 8 is a front view illustrating another example of the image display by the vehicle display device in the first embodiment.

As illustrated in FIG. 8, the image display unit 9 can display an image 50 such as characters or marks indicating the transmission shift positions behind the design unit 3. The image display unit 9 displays the image 50 indicating the transmission shift positions at a position where the image 50 can be seen alongside the shift position image 14b. The image display unit 9 displays the images of P, N, D, S, and L, which indicate the transmission shift positions. In the vehicle display device 1, the shift position image 14b displays the character of the shift position currently selected and the image 50 displays characters of the other shift positions. As illustrated in FIG. 8, the projection unit 5 causes the character D to be displayed as the shift position image 14b when the selected transmission shift position is "D". The image display unit 9 displays the image 50 of "P, N, S, L", which are the characters of the transmission shift positions other than "D", alongside the shift position image 14b.

The design unit 3 may not be transparent. In this case, the image display unit 9 does not display the image 40 at a position where the image 40 overlaps with the design unit 3 but may display the image 40 at a position where the image 40 does not overlap with the design unit 3.

Modification of the First Embodiment

Figure 9:
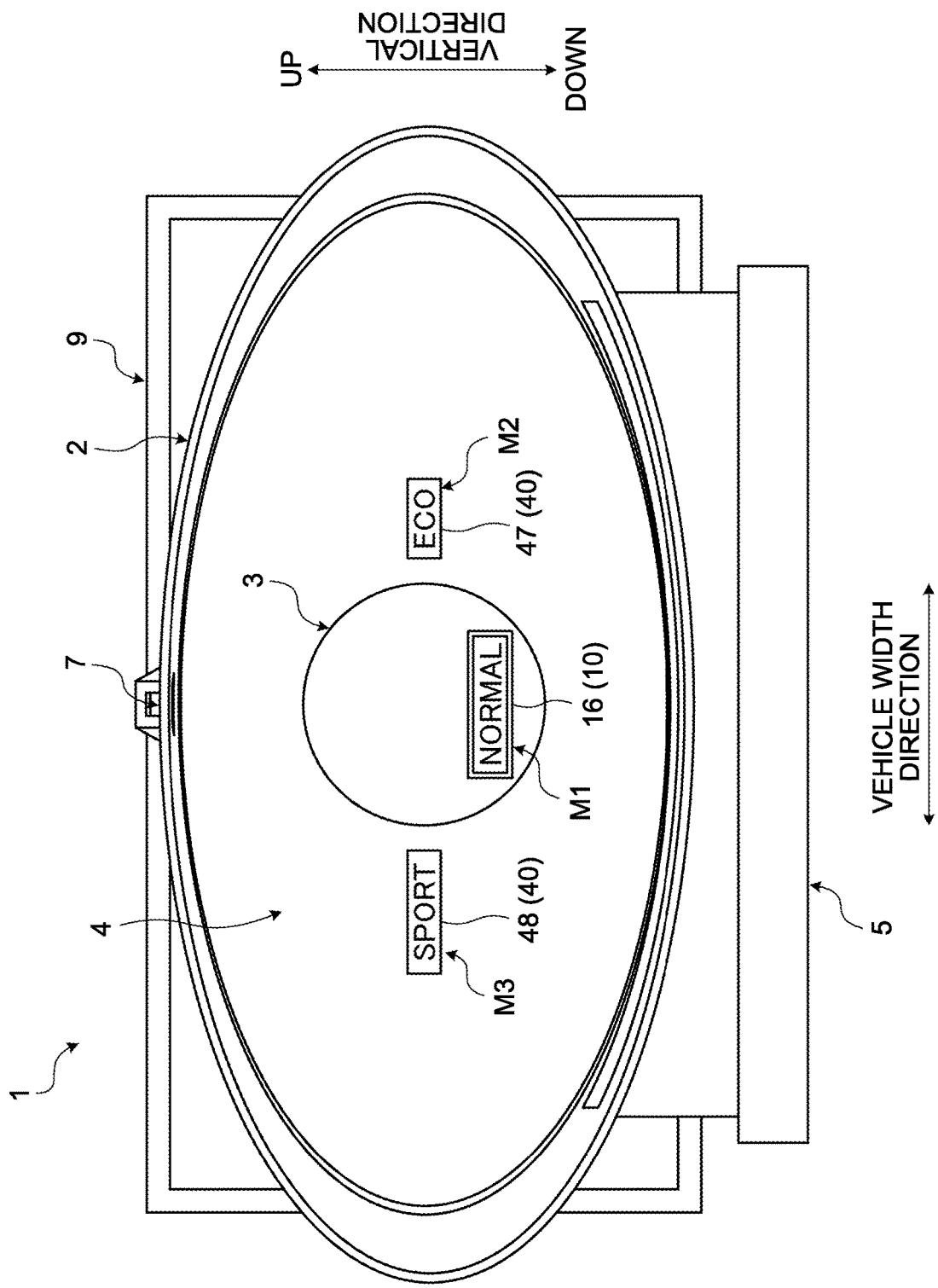
FIG. 9 is a front view illustrating a display image according to a modification of the first embodiment.
Figure 10:
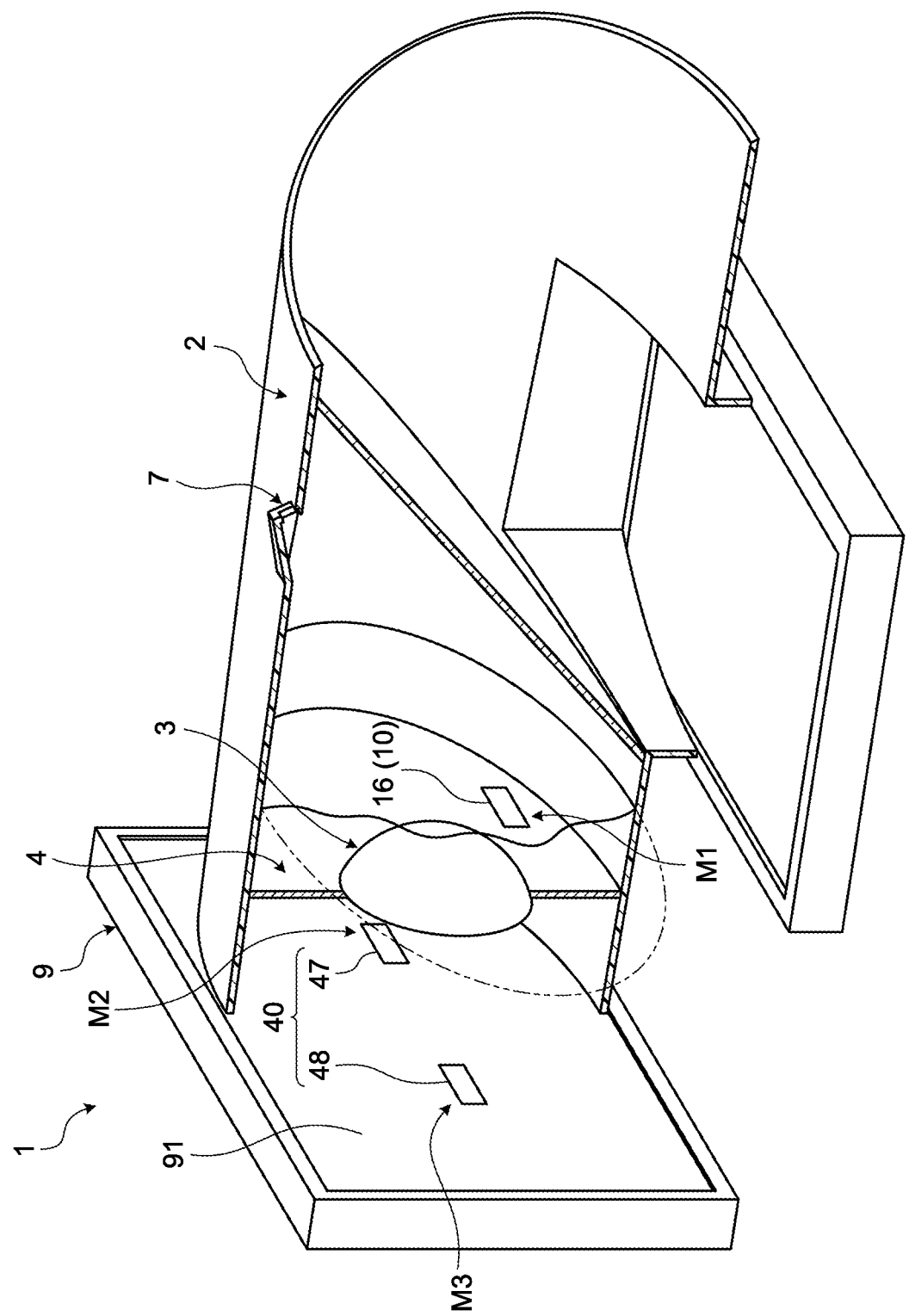
FIG. 10 is a cross-sectional perspective view illustrating the display image according to the modification of the first embodiment.
Figure 11:
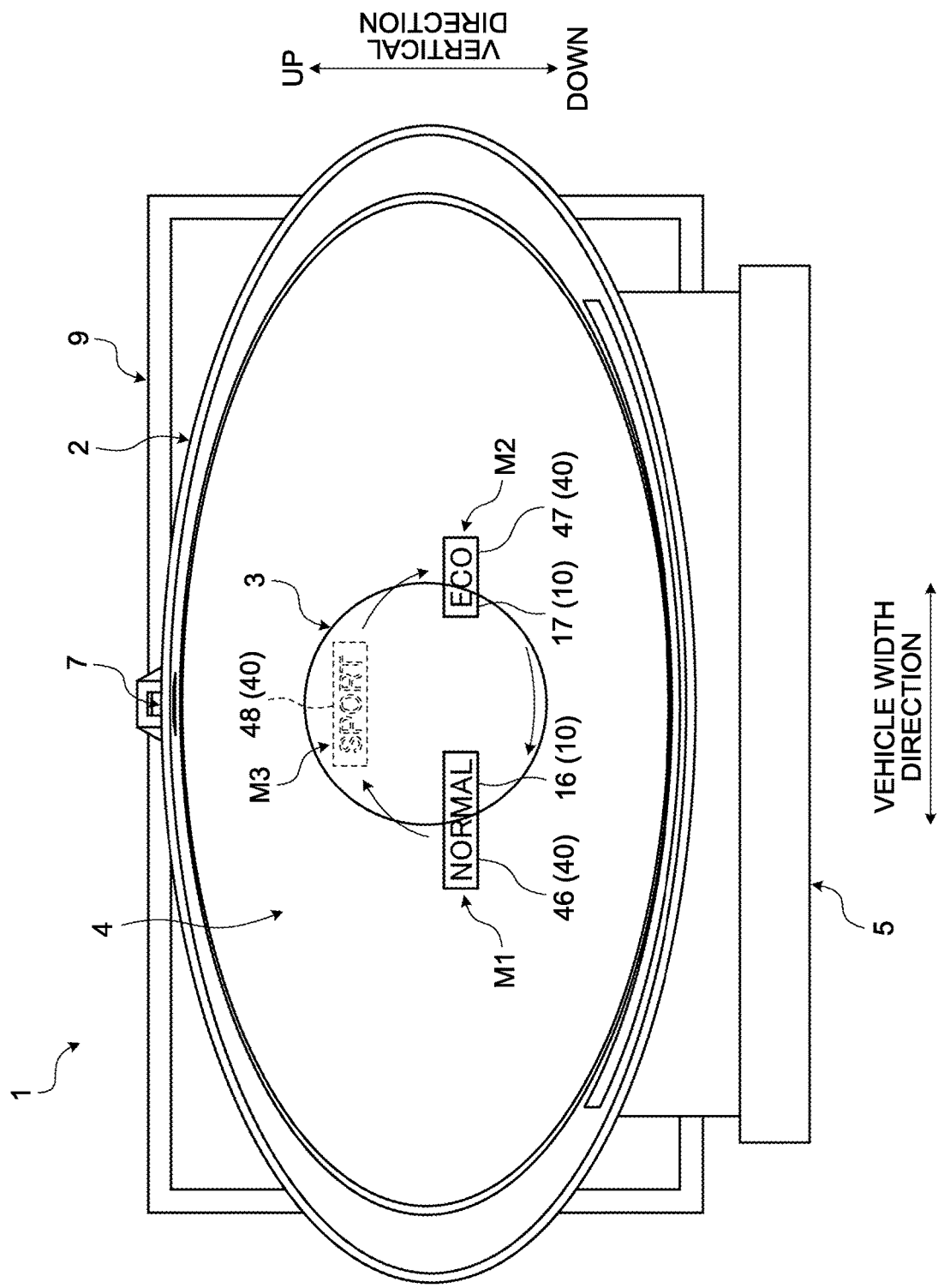
FIG. 11 is a front view for explaining the display image while being moved in the modification of the first embodiment.
Figure 12:
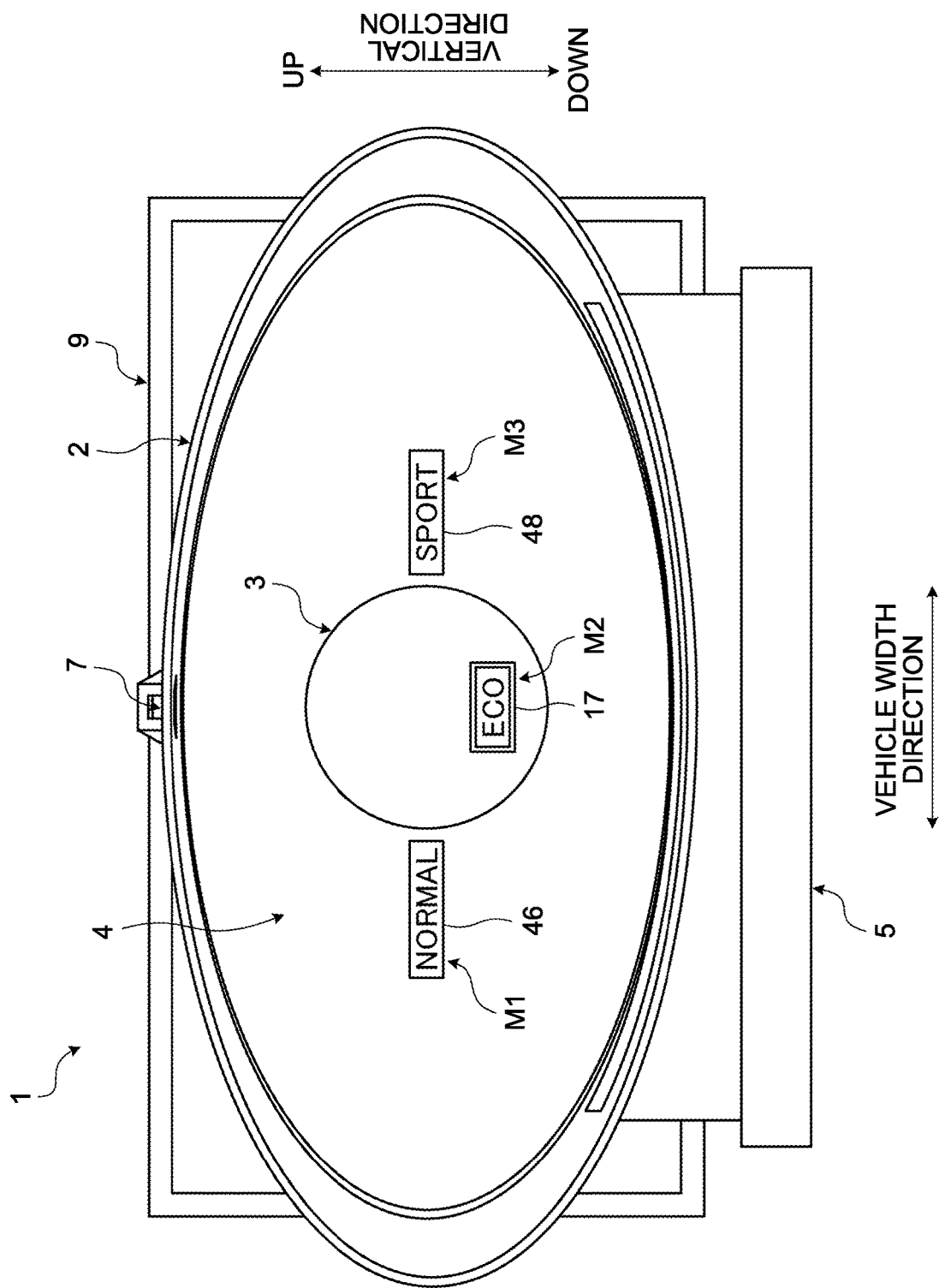
FIG. 12 is a front view for explaining the display image after the completion of the movement in the modification of the first embodiment.

The following describes a modification of the first embodiment. The vehicle display device 1 according to the modification displays images using both of the projection unit 5 and the image display unit 9. FIG. 9 is a front view illustrating a display image according to the modification of the first embodiment. FIG. 10 is a perspective cross-sectional view illustrating the display image according to the modification of the first embodiment. FIG. 11 is a front view for explaining the display image while being moved according to the modification of the first embodiment. FIG. 12 is a front view illustrating the display image after the completion of the movement according to the modification of the first embodiment.

The vehicle display device 1 displays a normal mode mark M1, an economy mode mark M2, and a sport mode mark M3. Each of the marks M1, M2, and M3 is a display image indicating the traveling mode of the vehicle 100. Each of the marks M1, M2, and M3 is displayed when the driver 106 selects a traveling mode. The driver 106 switches the traveling modes of the vehicle 100 by operating an operator such as a switch disposed on a steering column, for example.

As illustrated in FIG. 10, among the three marks M1, M2, and M3, the normal mode mark M1 is displayed by a virtual image 16, the economy mode mark M2 is displayed as an image 47 by the image display unit 9, and the sport mode mark M3 is displayed as an image 48 by the image display unit 9. The economy mark M2 and the sport mode mark M3 are displayed farther than the design unit 3 in the depth direction, and the normal mode mark M1 is displayed on a nearer side than the design unit 3 when viewed from the driver 106 side. As illustrated in FIG. 9, the economy mark M2 and the sport mode mark M3 are displayed on lateral sides of the design unit 3 such that the design unit 3 is interposed between the economy mark M2 and the sport mode mark M3, and the normal mode mark M1 is displayed in an overlapping manner with the design unit 3 when viewed from the driver 106 side. As a result, the driver 106 sees as if the three marks M1, M2, and M3 surround the design unit 3 from three directions. In other words, the driver 106 sees as if the three marks M1, M2, and M3 are in an orbit around the design unit 3.

The vehicle display device 1 changes the display positions of the respective marks M1, M2, and M3 in accordance with the driver's input operation performed on the operator. More specifically, the vehicle display device 1 changes the positions and sizes of the respective marks M1, M2, and M3 as if the respective marks M1, M2, and M3 rotate around the design unit 3. Out of the three marks M1, M2, and M3, the mark surrounded with double frames is currently activated. When the driver 106 performs a decision operation on the operator, a command is issued to shift the traveling mode to one corresponding to the mark activated at the timing.

When the driver 106 performs the input operation to change the activated mark, the vehicle display device 1 changes the display positions of the respective marks M1, M2, and M3. As illustrated in FIG. 11, the vehicle display device 1 moves the economy mode mark M2 toward the position where the normal mode mark M1 has been displayed, the sport mode mark M3 toward the position where the economy mode mark M2 has been displayed, and the normal mode mark M1 toward the position where the sport mode mark M3 has been displayed. The vehicle display device 1 moves the respective marks M1, M2, and M3 as if the three marks M1, M2, and M3 rotate around the design unit 3 while maintaining the relative positional relations among them in the circumferential direction.

As illustrated in FIG. 11, when rotating the three marks M1, M2, and M3, the vehicle display device 1 can display the marks M1, M2, and M3 through the combination of the virtual image 10 and the image 40 through the image display unit 9. In FIG. 11, the part overlapping with the design unit 3 of the economy mode mark M2 is displayed through a virtual image 17 and the remaining part of the economy mode mark M2 is displayed as the image 47 by the image display unit 9. In FIG. 11, the part overlapping with the design unit 3 of the normal mode mark M1 is displayed through the virtual image 16 and the remaining part of the normal mode mark M1 is displayed as an image 46 by the image display unit 9.

When rotating the three marks M1, M2, and M3, the vehicle display device 1 causes the image display unit 9 to display the mark to be displayed as being moving behind the design unit 3. In FIG. 11, the mark caused to be displayed as being moving behind the design unit 3 is the sport mode mark M3. The vehicle display device 1 causes the image display unit 9 to display the image 48 of the sport mode mark M3 at a position facing the design unit 3 in the image display unit 9. The driver 106 views the image 48 of the sport mode mark M3 through the design unit 3.

The vehicle display device 1 displays the activated mark out of the three marks M1, M2, and M3 in the largest size among them and the other marks in a smaller size than that of the activated mark. The vehicle display device 1 displays the mark displayed behind the design unit 3 out of the three marks M1, M2, and M3 in the smallest size among them. The differences in size among the marks M1, M2, and M3 produce the stereoscopic effect. The vehicle display device 1 may differentiate luminance or color between the part overlapping with the design unit 3 and the other part of each of the three marks M1, M2, and M3. In other words, the luminance or color of each of the marks M1, M2, and M3 may differ between a case where the marks are displayed using the projection unit 5 and a case where the marks are displayed by the image display unit 9, for example.

The activated mark is switched after the display form illustrated in FIG. 11, for example. FIG. 12 illustrates a state where the economy mode mark M2 is activated. The economy mode mark M2 is displayed through the virtual image 17 while the normal mode mark M1 is displayed as the image 46 and the sport mode mark M3 is displayed as the image 48 by the image display unit 9.

When the positions of the marks M1, M2, and M3 serving as the display image are changed, and the marks M1, M2, and M3 overlap with the design unit 3, the vehicle display device 1 according to the modification displays the part overlapping with the design unit 3 of each of the marks M1, M2, and M3 as the virtual image 10 by the projection unit 5 and the remaining part of each of the marks M1, M2, and M3 as the actual image by the image display unit 9. For example, the vehicle display device 1 causes the projection unit 5 to display the part overlapping with the design unit 3 of the normal mode mark M1 as the virtual image 16 and causes the image display unit 9 to display the remaining part of the normal mode mark M1 as the image 46. The modification displays the respective marks M1, M2, and M3 on the front surface side or the rear surface side of the design unit 3 depending on the respective positions relative to the design unit 3, thereby producing the stereoscopic effect.

Second Embodiment

Figure 13:
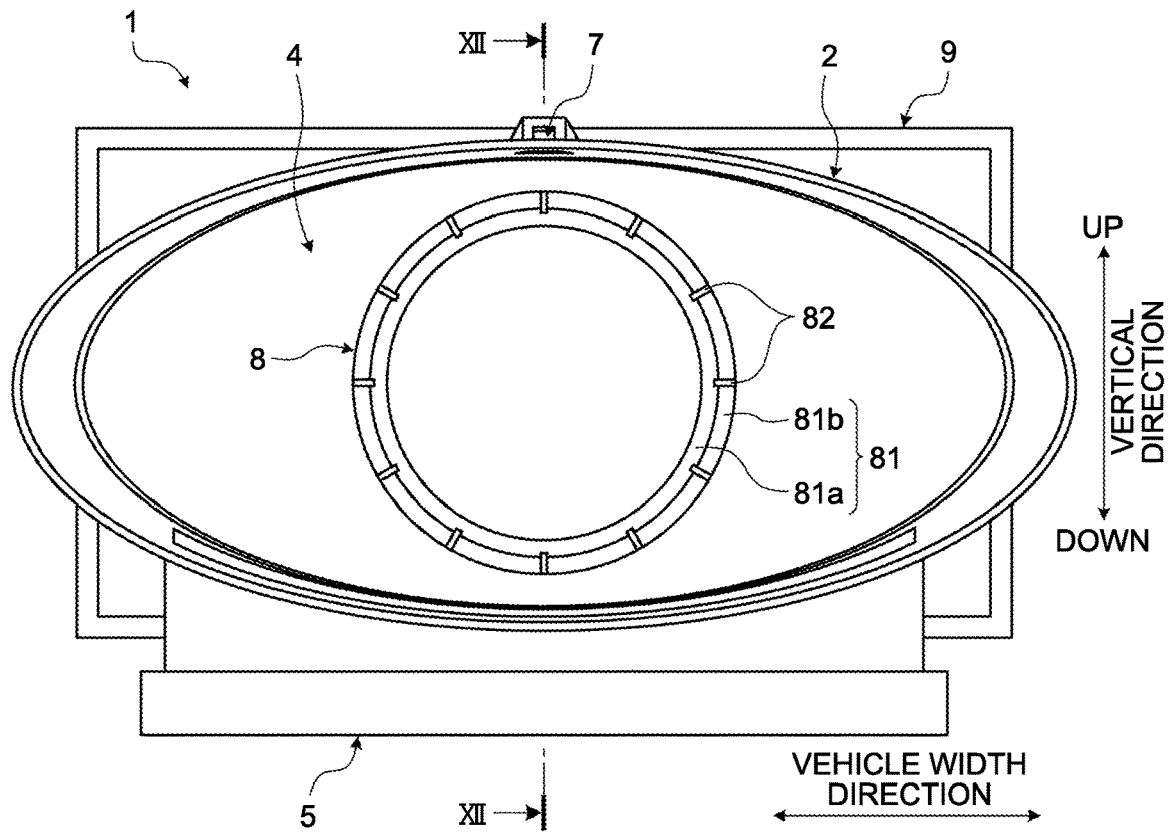
FIG. 13 is a front view of the vehicle display device according to a second embodiment.
Figure 14:
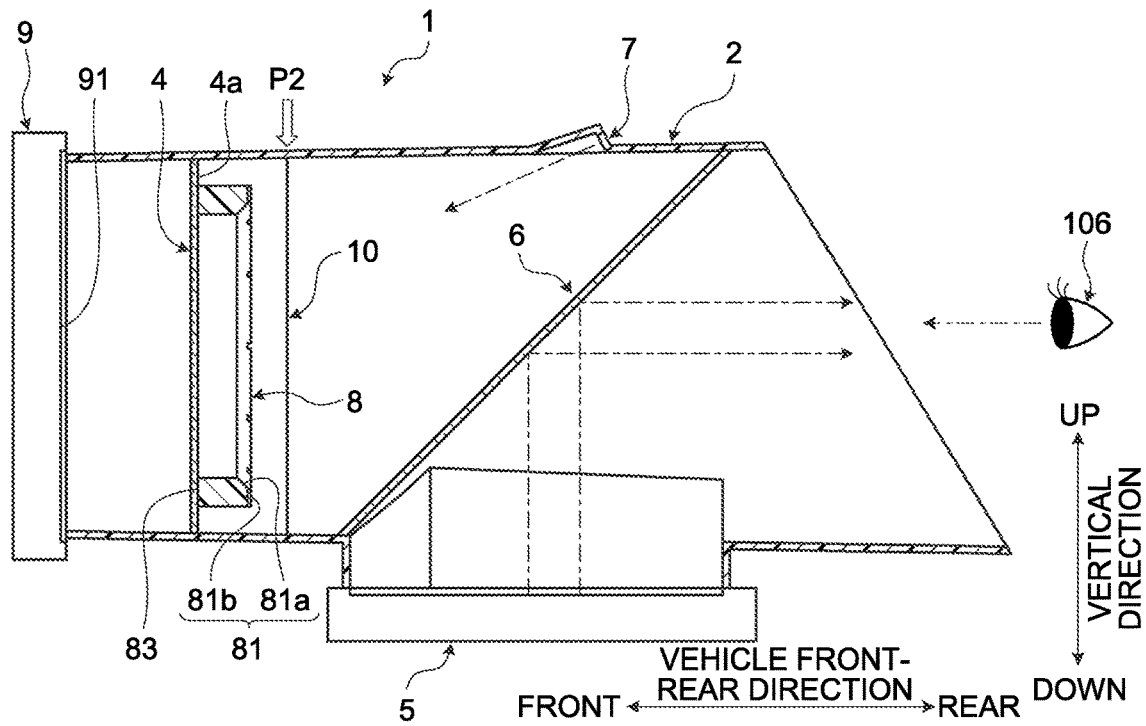
FIG. 14 is a cross-sectional view of the vehicle display device according to the second embodiment.
Figure 15:
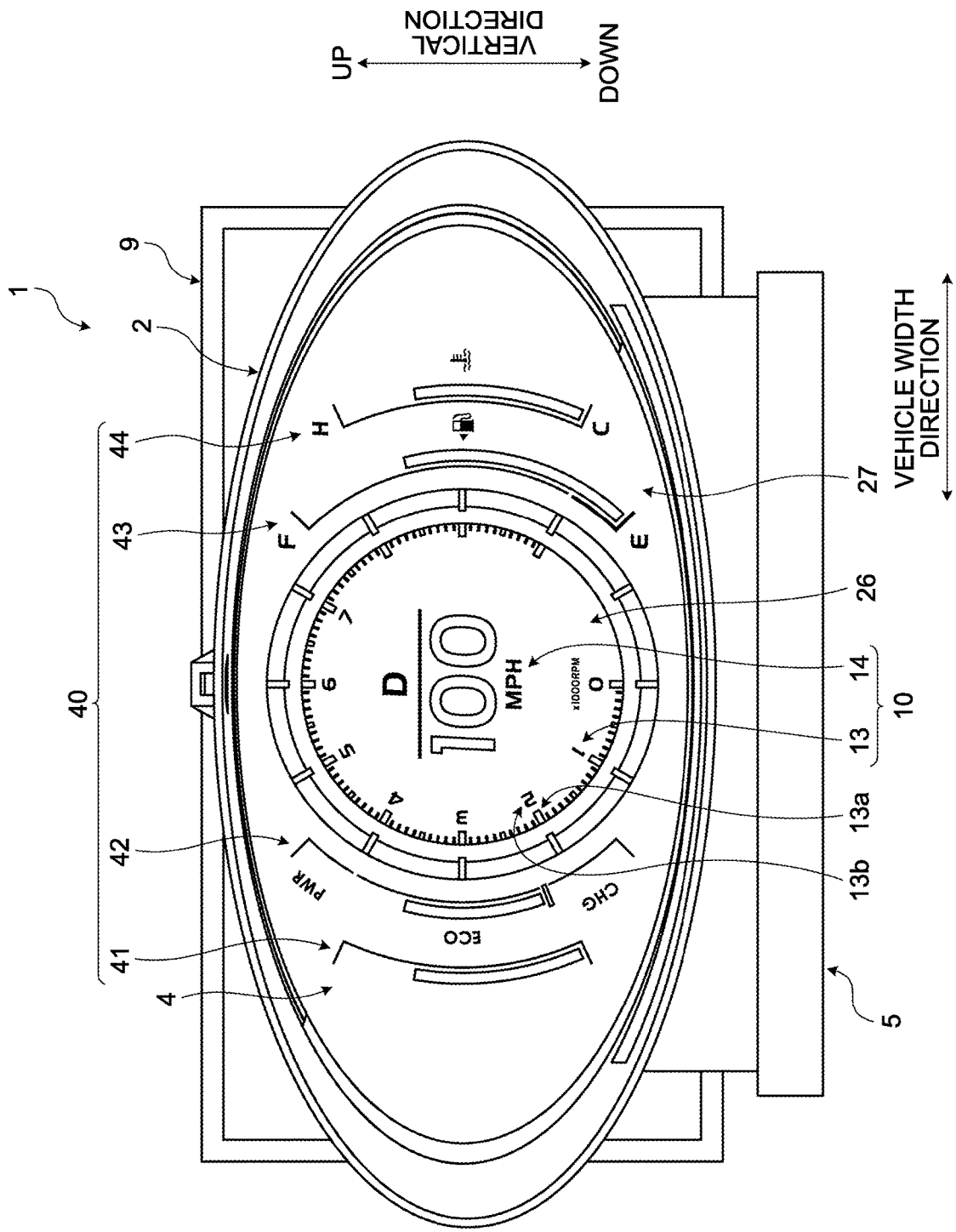
FIG. 15 is a front view illustrating an image displayed by the vehicle display device in the second embodiment.

The following describes a second embodiment with reference to FIGS. 13 to 15. In the second embodiment, the elements having the same functions as the first embodiment are labeled with the same numerals and duplicated descriptions thereof are omitted. FIG. 13 is a front view of the vehicle display device according to the second embodiment. FIG. 14 is a cross-sectional view of the vehicle display device according to the second embodiment. FIG. 15 is a front view illustrating images displayed by the vehicle display device according to the second embodiment. FIG. 14 illustrates a cross section along the line XII-XII in FIG. 13. The vehicle display device 1 in the second embodiment includes a design unit 8 having a ring geometry instead of the design unit 3 in the first embodiment.

The design unit 8 is a member having a ring geometry and a certain thickness. The design unit 8 in the present embodiment has a light blocking effect. The design unit 8 is formed of a metal or a synthetic resin, for example. The design unit 8 is disposed coaxially with the central axis line of tubular member 2. As illustrated in FIG. 14, a front edge 83 of the design unit 8 is fixed to the supporter 4 by adhesive bonding or welding, for example. The supporter 4 is a transparent plate-like member in the same manner as the supporter 4 in the first embodiment. As illustrated in FIG. 13, scales 82 are formed on a rear end surface 81 of the design unit 8. Each scale 82 is a groove extending in a radial direction of the design unit 8. The scales 82 are arranged with certain intervals along a circumferential direction of the design unit 8. In the vehicle display device 1 in the second embodiment, the scale images 45 in the first embodiment are replaced with the scales 82 of the design unit 8.

The end surface 81 of the design unit 8 has a tilted section 81a. In the design unit 8 in the present embodiment, one half of the region inside the end surface 81 in the radial direction is the tilted section 81a. The tilted section 81a is tilted in such a manner that as it moves internally in the radial direction, it moves forward (in the depth direction when viewed from the driver 106). In the end surface 81, an outer region from the tilted section 81a is a plane section 81b perpendicular to the axial direction of the tubular member 2. The tilted section 81a causes the design unit 8 to produce a stereoscopic effect. The tilted section 81a tilted with respect to the axial line direction of the tubular member 2 produces a visual effect causing the driver 106 to feel a sense of depth together with the inner wall surface of the tubular member 2.

As illustrated in FIG. 15, the vehicle display device 1 in the second embodiment displays the virtual image 10 and the image 40 in substantially the same manner as the first embodiment. The vehicle display device 1 in the second embodiment displays the indicator images 13 and the central display image 14 in the region surrounded by the design unit 8. In the indicator images 13, the intervals between the main scales of the scale images 13a and the numerical images 13b coincide with the intervals between the scales 82 of the design unit 8. As a result, the combination of the stereoscopic scales 82 physically existing and the indicators by the virtual image 10 forms a stereoscopic display.

As illustrated in FIG. 14, an image formed position P2 of the virtual image 10 in the vehicle display device 1 in the second embodiment is set further on the driver 106 side than the rear edge of the design unit 8. The rear edge of the design unit 8 is the plane section 81b perpendicular to the axial direction in the end surface 81. The image formed position P2 is slightly further on the driver 106 side than the plane section 81b. The setting of the image formed position P2 causes the driver 106 to see the virtual image 10 as if the virtual image 10 is displayed on the same plane as the plane section 81b of the design unit 8. The vehicle display device 1 in the present embodiment, thus, can produce a stereoscopic effect through the combination of the stereoscopically shaped design unit 8 and the virtual image 10. The combination of the virtual image 10 formed at the image formed position P2 and the design unit 8 having a deep stereoscopic shape forms a whole design. As a result, the driver 106 is easily aware of a breadth of the inner space of the tubular member 2 in the depth direction.

In the same manner as the first embodiment, the battery information image 41, the power information image 42, the fuel information image 43, and the water temperature information image 44 are displayed in the image display unit 9. The vehicle display device 1 in the second embodiment can produce the stereoscopic effect and the sense of feeling depth of the display in the same manner as the first embodiment.

Modifications of the Respective Embodiments

The following describes modifications of the first and the second embodiments. The indicator images 13 may be the indicators of the traveling speed of the vehicle 100 instead of the engine rotating speed. The type, shape, and arrangement of the images included in the virtual image 10 are not limited to those exemplarily described in the respective embodiments. The virtual image 10 may include other images in addition to or in place of the images of information about the vehicle condition, for example. For example, the virtual image 10 may include a navigation image, a broadcast television image, and a video image. The type, shape, and arrangement of the image 40 by the image display unit 9 are not limited to those exemplarily described in the respective embodiments. For example, the image 40 in the image display unit 9 may include a navigation image, a broadcast television image, and a video image.

The vehicle display device 1 is not limited to a meter device that displays the information about the vehicle condition. The vehicle display device 1 may be used for a center display or other displays disposed inside the vehicle cabin, for example.

The projection unit 5 may be disposed on the upper side or on the lateral side of the tubular member 2. The projection unit 5 that projects an image is not limited to a liquid crystal display. The projection unit 5 may be an image display such as a plasma display panel. The images displayed by the projection unit 5 and the image display unit 9 are produced in accordance with the commands from the controller 11, and typically, produced by adjusting colors and luminance of a plurality of pixels two-dimensionally arranged. The projection unit 5 is preferably capable of projecting images. The projection unit 5 is not limited to project images. The projection unit 5 may project a predetermined character or mark as a warning lamp, for example. In this case, the projection unit 5 is preferably capable of appropriately switching display and non-display of the character or the mark. The projection unit 5 may project a character or a mark with the combination of display and non-display of a plurality of segments as a digital display displaying a number with seven segments.

The image display unit 9 is not limited to a liquid crystal display and may be any image display as long as it displays images. The image display unit 9 may be an image display such as a plasma display panel.

The vehicle display device 1 may have a plurality of design units. For example, the vehicle display device 1 may have both of the design unit 3 in the first embodiment and the design unit 8 in the second embodiment. The multiple design units may be arranged at different positions along the axial direction of the tubular member 2.

The structure and the shape of the tubular member 2 are not limited to the exemplified ones. The front edge of the tubular member 2 may be closed by a wall having a light blocking effect. In this case, the image display unit 9 is disposed inside the tubular member 2. The tubular member 2 may have a partition that is provided to the front edge, partitions the inner space of the tubular member 2 from the external space, has an opening, and has a light blocking effect. The image display unit 9 is disposed in the external space such that the display surface 91 closes the opening of the partition. In this case, the driver 106 views the image in the image display unit 9 through the opening. The tubular member 2 may be composed of a combined plurality of structural portions. For example, the tubular member 2 may be composed of a combined plurality of structural portions each having a half-round shape. The cross section of the tubular member 2 may be a rectangle or a polygon.

The contents disclosed in the embodiments and the modifications described above can be implemented by appropriately combining them.

The vehicle display device according to the embodiments includes a tubular member disposed such that an opening edge thereof faces a driver side, a projection unit that projects light toward an inner space of the tubular member, a semitransparent mirror that is disposed in the inner space of the tubular member and reflects light projected from the projection unit toward the driver side to cause a virtual image to be displayed, an image display unit that is disposed on a side opposite to the driver side with respect to the semitransparent mirror in the tubular member and displays an image, and a design unit that is disposed between the image display unit and the semitransparent mirror in the inner space of the tubular member and has a stereoscopic shape. The vehicle display device according to the embodiments displays the virtual image such that at last a part of the virtual image overlaps with the design unit. The vehicle display device according to the embodiments has an advantageous effect of making it possible to enhance a stereoscopic effect through the combination of the virtual image displayed such that a part of the virtual image overlaps with the design unit, the image in the image display and the design unit having a stereoscopic shape.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device, comprising:
    a tubular member that includes an inner space and an opening edge that faces a driver side;
    a projection device disposed on a lower portion of the tubular member that includes an image display surface that faces upward and projects a first image toward the inner space of the tubular member;
    a semitransparent mirror that is disposed in the inner space of the tubular member, and reflects light of the first image projected from the image display surface of the projection device toward the driver side to cause a virtual image to be displayed;
    an image display device that is disposed on a side opposite to the driver side with respect to the semitransparent mirror in the tubular member, and includes a display surface that displays a second image; and
    a design device that includes a surface that is disposed between the image display device and the semitransparent mirror in the inner space of the tubular member, and the surface of the design device is a semitransparent surface or a transparent surface that has a shape such that the design device produces a stereoscopic image of the virtual image that conforms to the shape of the surface of the design device; and a controller in electrical communication with each of the projection device and the image display device and configured to command each of the projection device and the image display device on a content of the first image and a content the second image, respectively, wherein the virtual image is displayed such that at least a part of the virtual image overlaps with the design device, the projection device is configured to produce the content of the first image in accordance with a first command received from the controller, and the image display device is configured to produce the content of the second image in accordance with a second command received from the controller.

2. The vehicle display device according to claim 1, wherein the projection device projects an image and causes the image to be displayed as a virtual image.

3. The vehicle display device according to claim 1, wherein
the image display device is positioned on a side opposite to the driver side with respect to a position at which the virtual image is formed.

4. The vehicle display device according to claim 2, wherein
the image display device is positioned on a side opposite to the driver side with respect to a position at which the virtual image is formed.

5. The vehicle display device according to claim 1, wherein
the design device is a transparent member, and
an image in the image display device is capable of being viewed from the driver side through the design device.

6. The vehicle display device according to claim 2, wherein
the design device is a transparent member, and
an image in the image display device is capable of being viewed from the driver side through the design device.

7. The vehicle display device according to claim 3, wherein
the design device is a transparent member, and
an image in the image display device is capable of being viewed from the driver side through the design device.

8. The vehicle display device according to claim 1, wherein
the projection device projects an image and causes the image to be displayed as a virtual image, and
when a position of a display image is changed and the display image overlaps with the design device, the vehicle display device causes the projection device to display a part of the display image overlapping with the design device as a virtual image, and causes the image display device to display a remaining part of the display image as an actual image.

9. The vehicle display device according to claim 3, wherein
the projection device projects an image and causes the image to be displayed as a virtual image, and
when a position of a display image is changed and the display image overlaps with the design device, the vehicle display device causes the projection device to display a part of the display image overlapping with the design device as a virtual image, and causes the image display device to display a remaining part of the display image as an actual image.

10. The vehicle display device according to claim 5, wherein
the projection device projects an image and causes the image to be displayed as a virtual image, and
when a position of a display image is changed and the display image overlaps with the design device, the vehicle display device causes the projection device to display a part of the display image overlapping with the design device as a virtual image, and causes the image display device to display a remaining part of the display image as an actual image.

11. The vehicle display device according to claim 1, further comprising:
a supporter that is interposed between the tubular member and the design device, supports the design device, and is transparent.

12. The vehicle display device according to claim 2, further comprising:
a supporter that is interposed between the tubular member and the design device, supports the design device, and is transparent.

13. The vehicle display device according to claim 3, further comprising:
a supporter that is interposed between the tubular member and the design device, supports the design device, and is transparent.

14. The vehicle display device according to claim 5, further comprising:
a supporter that is interposed between the tubular member and the design device, supports the design device, and is transparent.

15. The vehicle display device according to claim 8, further comprising:
a supporter that is interposed between the tubular member and the design device, supports the design device, and is transparent.

16. The vehicle display device according to claim 11, wherein
the supporter is a plate-like member that partitions the inner space of the tubular member and supports the design device at a position apart from an inner wall surface of the tubular member.

17. The vehicle display device according to claim 1, wherein
the design device is a curved plate member such that the surface of the design device has a shape that corresponds to a portion of a hollow sphere.

18. The vehicle display device according to claim 17, wherein
the surface of the design device faces the semitransparent mirror and is convex toward the semitransparent mirror.

19. The display device according to claim 1, wherein
the design device is fixed with respect to each of the projection device and the image display device.

* * * * *